US012585139B2

(12) United States Patent
Daiku

(10) Patent No.: US 12,585,139 B2
(45) Date of Patent: Mar. 24, 2026

(54) AERIAL DISPLAY APPARATUS

(71) Applicant: TOPPAN Holdings Inc., Tokyo (JP)

(72) Inventor: Yasuhiro Daiku, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 799 days.

(21) Appl. No.: 17/901,106

(22) Filed: Sep. 1, 2022

(65) Prior Publication Data

US 2022/0413317 A1 Dec. 29, 2022

Related U.S. Application Data

(63) Continuation of application No. PCT/JP2021/007835, filed on Mar. 2, 2021.

(30) Foreign Application Priority Data

Mar. 2, 2020 (JP) ................................. 2020-034808

(51) Int. Cl.
*G02B 30/56* (2020.01)
*G02B 5/122* (2006.01)

(52) U.S. Cl.
CPC ............. *G02B 30/56* (2020.01); *G02B 5/122* (2013.01)

(58) Field of Classification Search
CPC ........ G02B 30/00; G02B 30/50; G02B 30/56; G02B 5/12; G02B 5/122; G02B 5/124; G02B 6/0046; G02B 6/0053
See application file for complete search history.

(56) References Cited

U.S. PATENT DOCUMENTS

| | | | |
|---|---|---|---|
| 2007/0200974 A1* | 8/2007 | Daiku | G02B 6/0025 349/65 |
| 2017/0102552 A1* | 4/2017 | Otsubo | G02B 30/56 |
| 2018/0045972 A1 | 2/2018 | Dai et al. | |

(Continued)

FOREIGN PATENT DOCUMENTS

| | | |
|---|---|---|
| JP | 7-306411 A | 11/1995 |
| JP | 2017-67933 A | 4/2017 |
| JP | 2019-32404 A | 2/2019 |

(Continued)

OTHER PUBLICATIONS

Extended Search Report issued on Apr. 16, 2024, in corresponding European Patent Application No. 21764799.9, 8 pages.

(Continued)

*Primary Examiner* — Jyotsna V Dabbi
(74) *Attorney, Agent, or Firm* — Maier & Maier, PLLC

(57) ABSTRACT

An aerial display apparatus includes: a light source unit that emits light; a display device that transmits the light from the light source unit to display an image; a light control device that transmits the light from the display device to emit the light such that light intensity of the light has a peak in a direction oblique to a normal direction that is perpendicular to a first direction within a principal plane of the display device; and a mirror device that reflects the light from the light control device to display an image in air on a side opposite to the light control device. The mirror device includes a plurality of optical elements each having a hexahedron shape. Each of the plurality of optical elements includes first and second reflection surfaces that reflect light. Each of the first and second reflection surfaces is placed obliquely to the normal direction.

9 Claims, 10 Drawing Sheets

(56) References Cited

U.S. PATENT DOCUMENTS

2019/0179160 A1    6/2019  Ito et al.
2021/0096393 A1    4/2021  Daiku

FOREIGN PATENT DOCUMENTS

JP      2019139023 A  *  8/2019  ............. G02B 27/22
WO    WO-2019030991 A1 *  2/2019  ............. G02B 30/60
WO      2019240137 A1    12/2019

OTHER PUBLICATIONS

International Search Report (Form PCT/ISA/210); mailed May 18, 2021 in corresponding PCT Application No. PCT/JP2021/007835 (3 pages) (2 pages English Translation).
Written Opinion (Form PCT/ISA/237); mailed May 18, 2021 in corresponding PCT Application No. PCT/JP2021/007835 (4 pages).
Written Opinion (Form PCT/ISA/237); mailed Sep. 6, 2022 in corresponding PCT Application No. PCT/JP2021/007835 (4 pages) (4 pages English Translation).
International Report on Patentability (Form PCT/IB/373); mailed Sep. 6, 2022 in corresponding PCT Application No. PCT/JP2021/007835 (1 page).
Notification of Transmittal of Translation of International Report on Patentability (Form PCT/IB/338); mailed Sep. 15, 2022 in corresponding PCT Application No. PCT/JP2021/007835 (1 page).

* cited by examiner

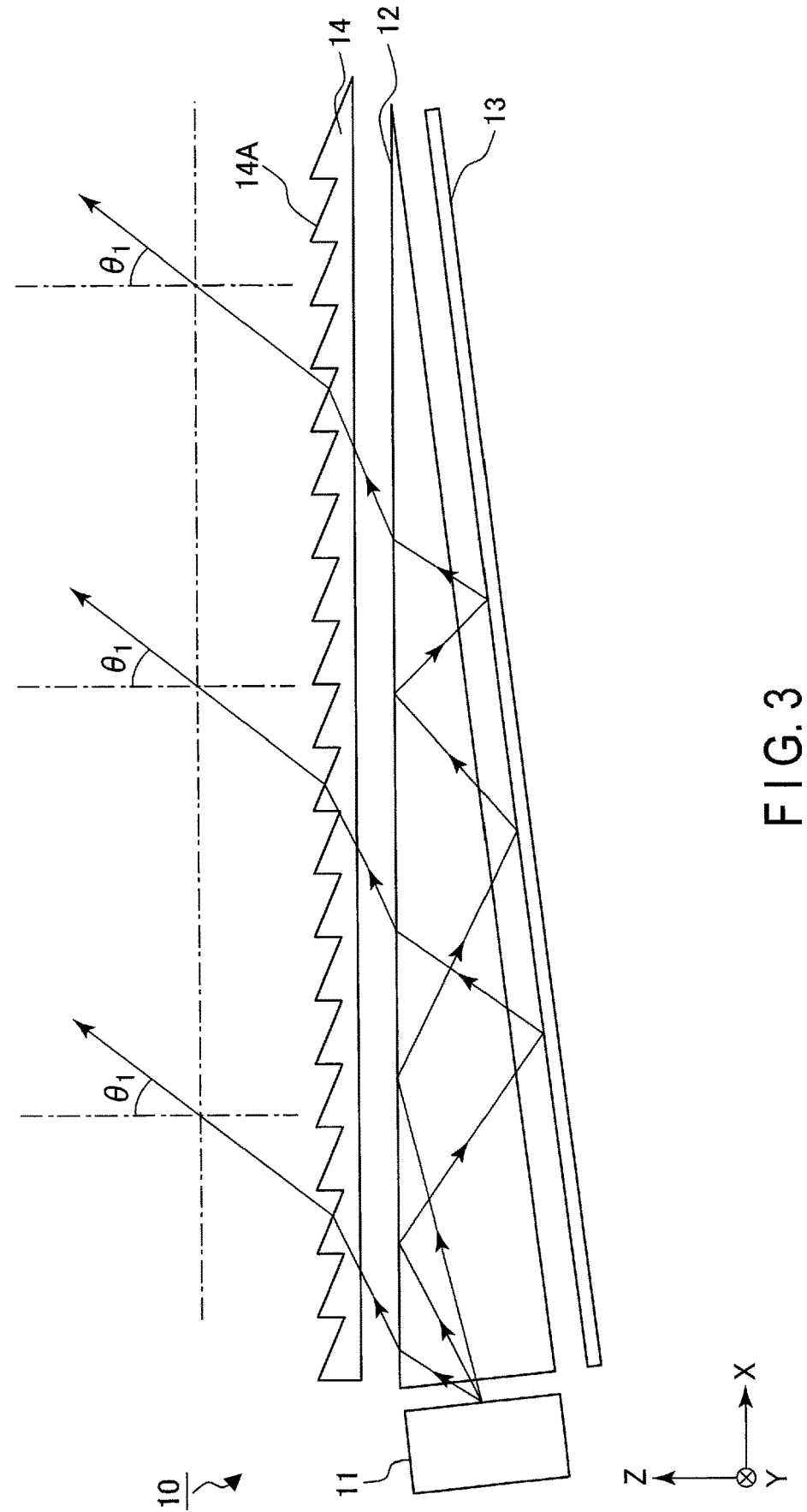
F I G. 3

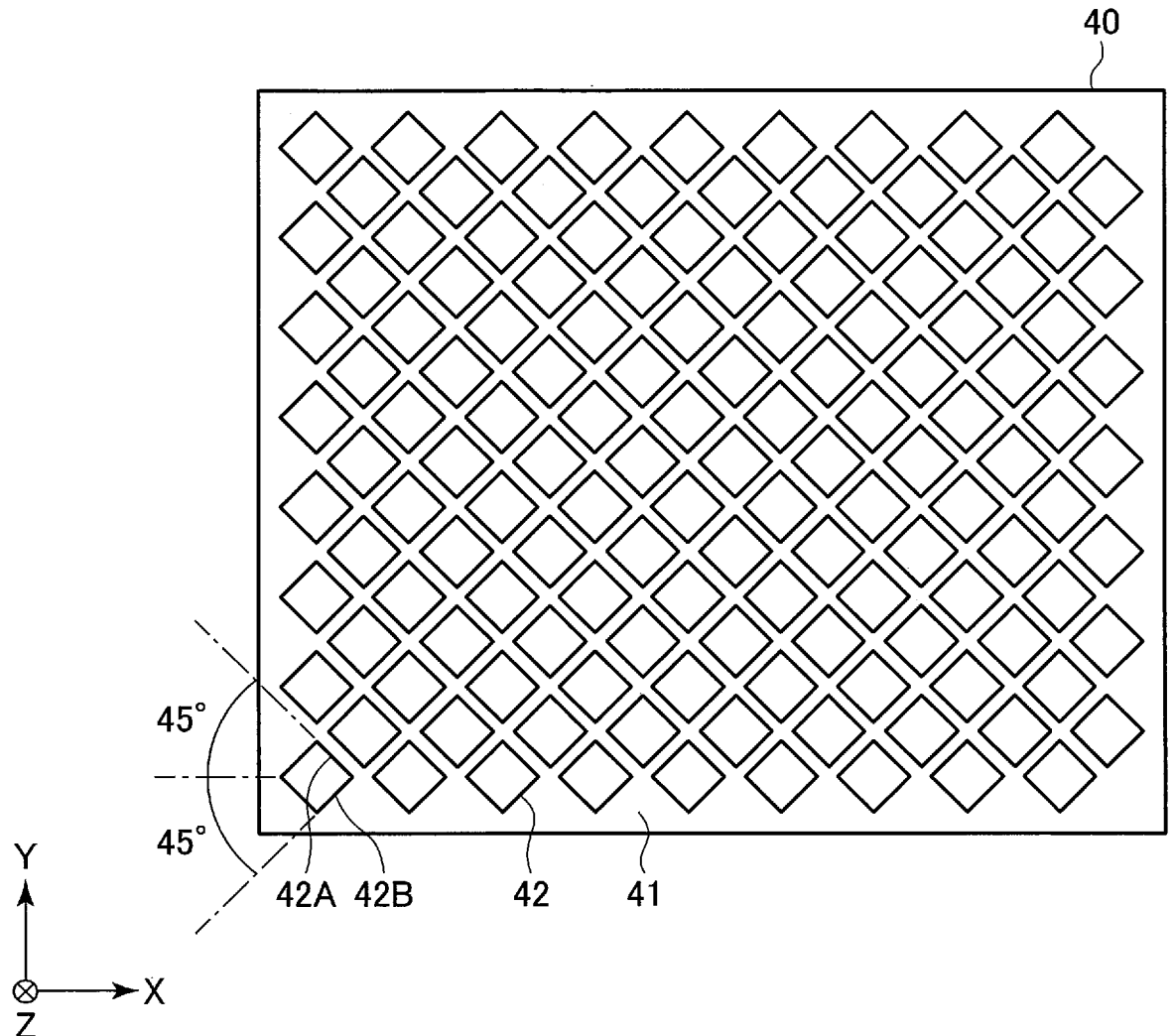
F I G. 6

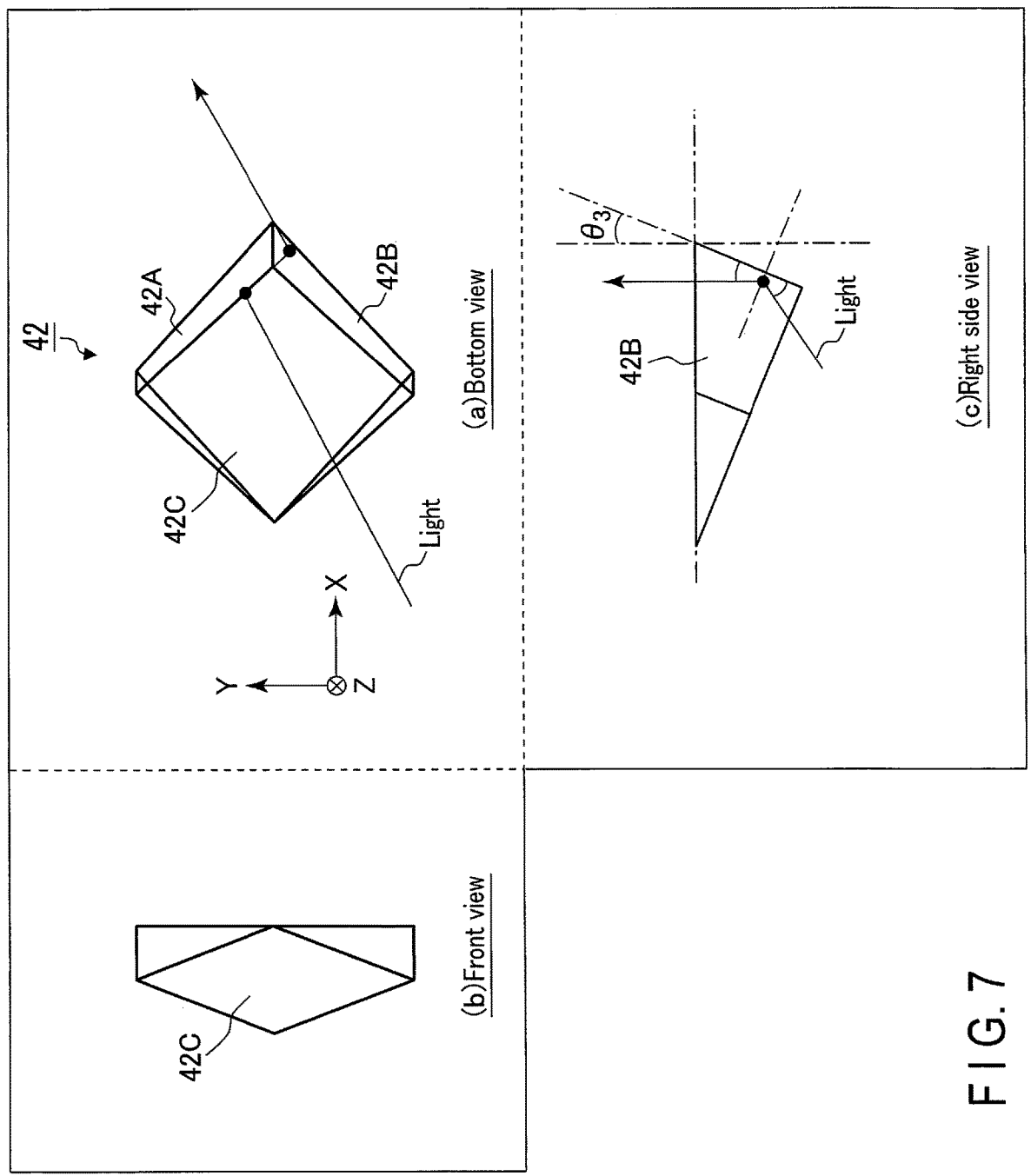
(a)Bottom view
(b)Front view
(c)Right side view
F I G. 7

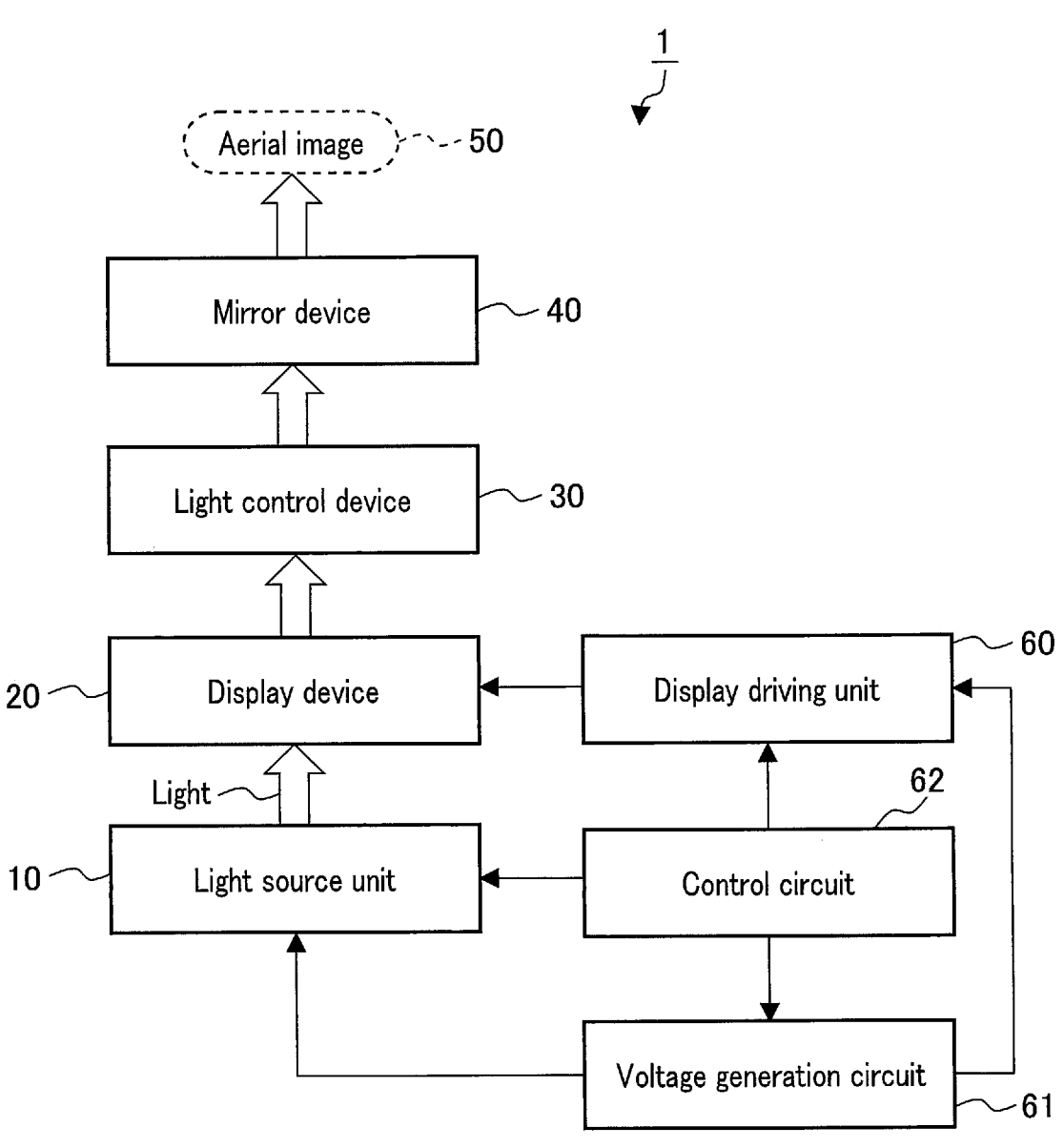
F I G. 9

Emission light from light source unit
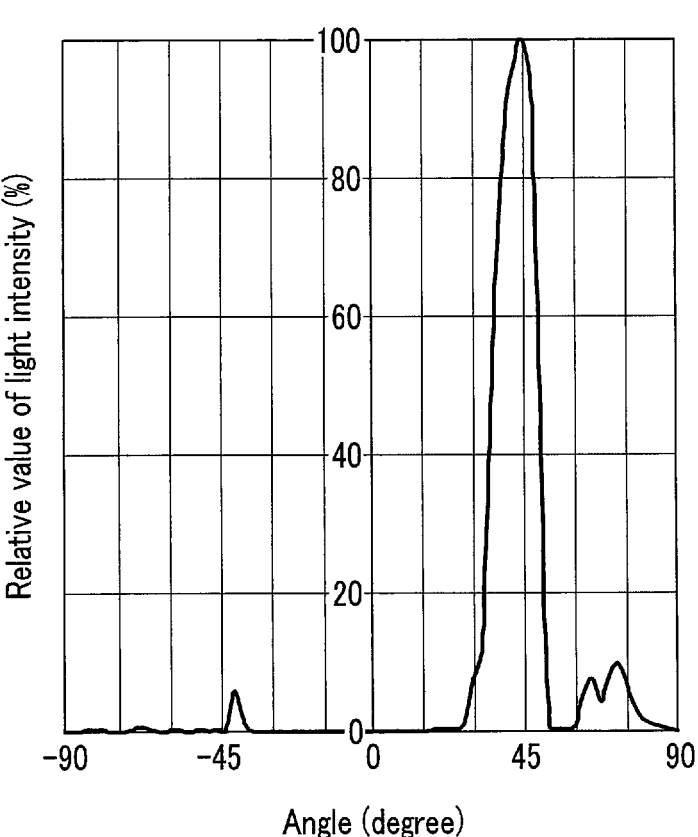
F I G. 10

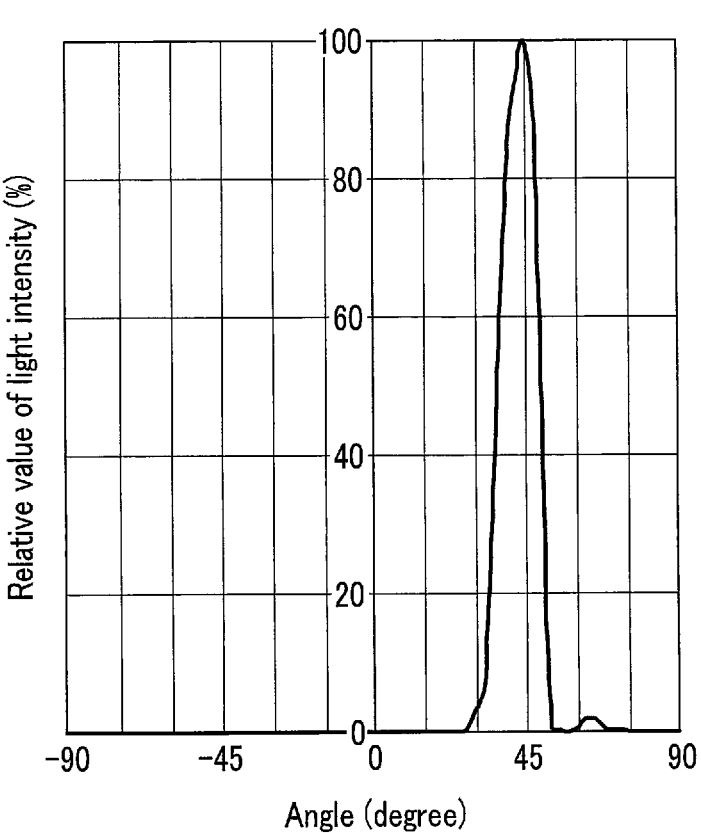
F I G. 11

AERIAL DISPLAY APPARATUS

CROSS-REFERENCE TO RELATED APPLICATIONS

This application is a Continuation Application of PCT Application No. PCT/JP2021/007835, filed Mar. 2, 2021, and based upon and claiming the benefit of priority from Japanese Patent Application No. 2020-034808, filed Mar. 2, 2020, the entire contents of all of which are incorporated herein by reference.

FIELD

The present invention relates to an aerial display apparatus.

BACKGROUND

An aerial display apparatus that can display an image or a video as an aerial image has been studied, and expected as a new human-machine interface. For example, the aerial display apparatus displays an image or the like in the air by a dihedral corner reflector array, in which dihedral corner reflectors are arranged in an array, reflecting light emitted from a display surface of a display device (for example, see Patent Literature (Jpn. Pat. Appln. KOKAI Publication No. 2017-67933)). The display method by the dihedral corner reflector array is free of an aberration and the image or the like is displayed at a plane-symmetric position.

SUMMARY

According to an aspect of the present invention, there is provided an aerial display apparatus comprising:
a light source unit that emits light;
a display device that transmits the light from the light source unit to display an image;
a light control device that transmits the light from the display device to emit the light such that light intensity of the light has a peak in a direction oblique to a normal direction that is perpendicular to a first direction within a principal plane of the display device; and
a mirror device that reflects the light from the light control device to display an image in air on a side opposite to the light control device,
wherein the mirror device includes a plurality of optical elements each having a hexahedron shape,
each of the plurality of optical elements includes first and second reflection surfaces that reflect light, and
each of the first and second reflection surfaces is placed obliquely to the normal direction.

BRIEF DESCRIPTION OF THE DRAWINGS

FIG. 3 is a side view of a light source unit shown in FIG. 1.
FIG. 6 is a bottom view of a mirror device shown in FIG. 1.

FIG. 7 shows diagrams describing an optical element of the mirror device.
FIG. 9 is a block diagram of the aerial display apparatus.
FIG. 10 is a chart showing a relation between the intensity and the angle in illumination light emitted from the light source unit.
FIG. 11 is a chart showing a relation between the intensity and the angle in display light emitted from the light control device.

DETAILED DESCRIPTION

Figure 1:
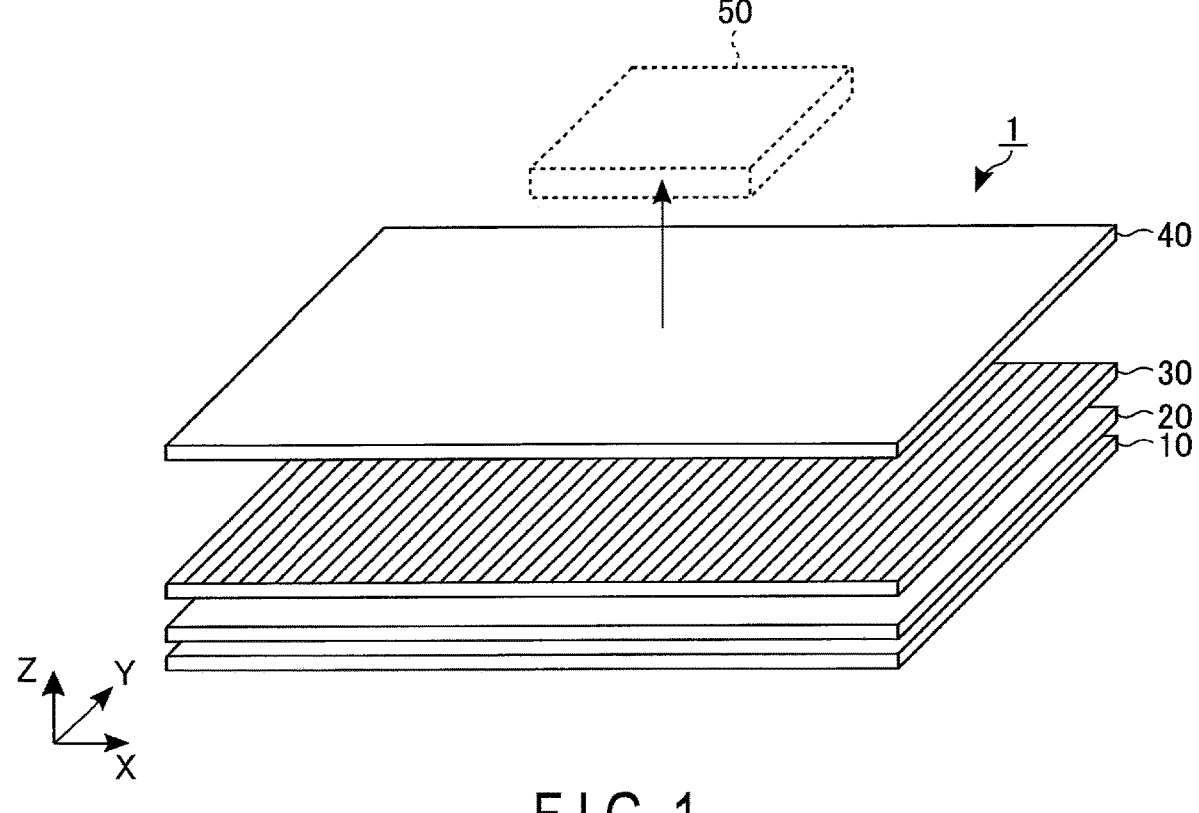
FIG. 1 is a perspective view of an aerial display apparatus according to an embodiment of the present invention.

An embodiment is described below with reference to the drawings. Note that the drawings are schematic or conceptual, and the dimension, ratio, or the like in each of the drawing is not necessarily the same as the actual one. In addition, the drawings may include portions that differ in the relationship in dimensions and in the ratio even though the portions are the same. Particularly, some of the embodiments shown below exemplify a device and a method for embodying the technical concept of the present invention, and the technical concept of the present invention is not specified by the shape, configuration, placement, and the like of the components. Note that, in the following description, the elements having the same function and configuration are denoted by the same reference sign, and the repeated description thereof will be omitted.

[1] Overall Configuration of Aerial Display Apparatus

An aerial display apparatus is provided with an aerial image forming element (referred to as a mirror device) provided with a dihedral corner reflector array, and displays an image and a video in the air by the mirror device reflecting display light emitted from a display surface of a display device.

Figure 2:
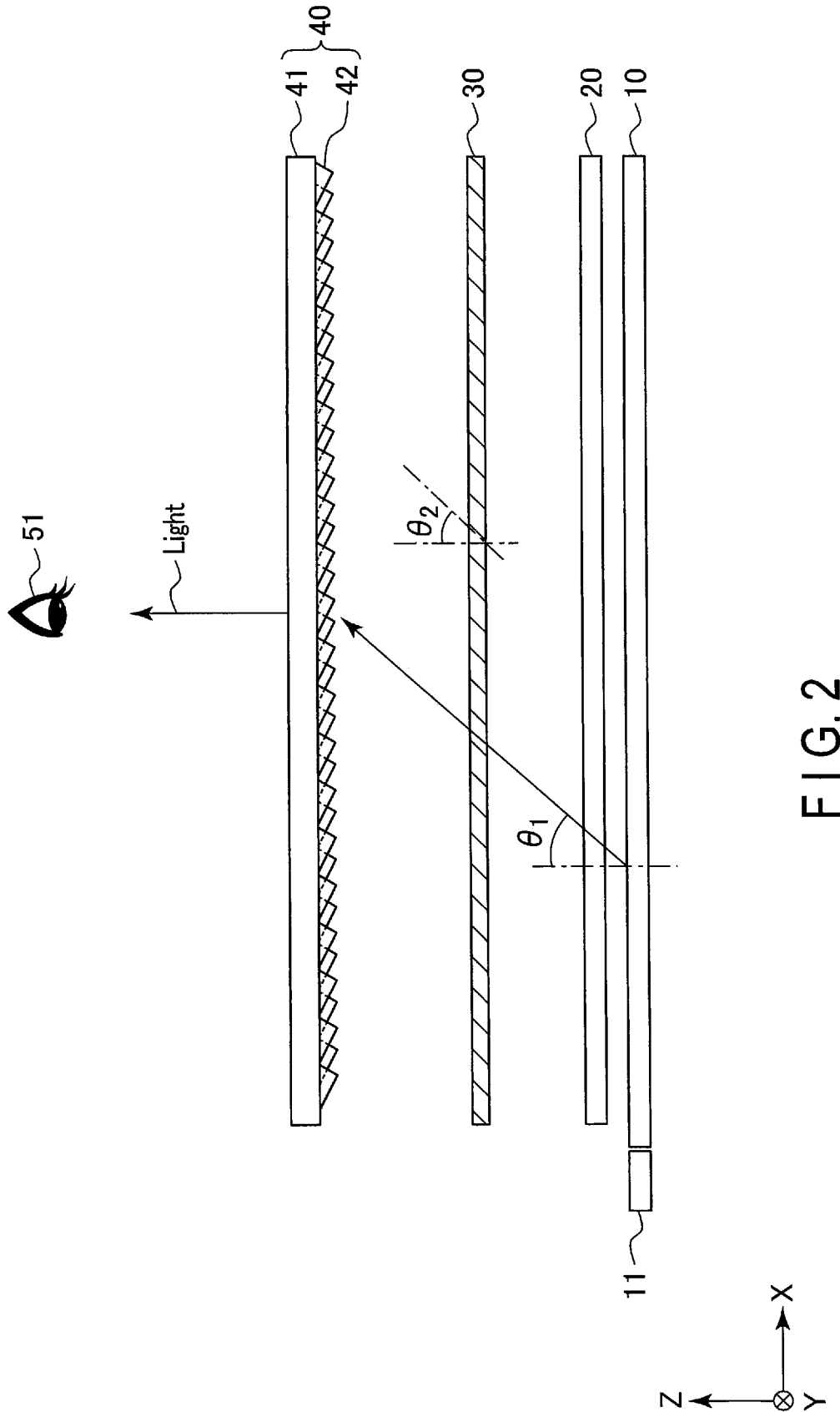
FIG. 2 is a side view of the aerial display apparatus shown in FIG. 1.

FIG. 1 is a perspective view of an aerial display apparatus 1 according to an embodiment of the present invention. FIG. 2 is a side view of the aerial display apparatus 1 shown in FIG. 1. The X-direction of FIG. 1 is a direction along a side of the aerial display apparatus 1, the Y-direction is a direction orthogonal to the X-direction in a horizontal plane, and the Z-direction is a direction orthogonal to the X-Y plane (also referred to as a normal direction).

The aerial display apparatus 1 is provided with a light source unit (also referred to as a back light) 10, a display device (also referred to as a light modulation device) 20, a light control device 30, and a mirror device 40. The light source unit 10, the display device 20, the light control device 30, and the mirror device 40 are placed in this order along the Z-direction and are also placed such that the respective principal planes are parallel to each other. Note that in FIG. 1, a plurality of devices constituting the aerial display apparatus 1 are shown to be floating, but these devices are fixed to the positions of the drawing by unillustrated support members. The same applies to the drawings to be shown below.

The light source unit 10 produces illumination light and emits this illumination light toward the display device 20. The light source unit 10 is formed of a surface light source. The light source unit 10 is configured with the back light of, for example, a side light type (an edge light type). The light source unit 10 is provided with a light-emitting element 11 provided on a side surface of a light guide plate. The light-emitting element 11 is configured with, for example, a light emitting diode (LED) that emits white light.

In the present embodiment, the light source unit 10 emits the illumination light such that the light intensity has a peak in an oblique direction having an angle $\theta_1$ with respect to the normal direction. The angle $\theta_1$ is 30 degrees or more and 60 degrees or less. In the present embodiment, the angle $\theta_1$ is approximately 45 degrees. The illumination light of the light source unit 10 is polarized in the Y-direction. The specific configuration of the light source unit 10 will described later.

The Display device 20 is a transmission type display device. The display device 20 is configured with, for example, a liquid crystal display device. The driving mode of the display device 20 is not particularly limited, and a TN (Twisted Nematic) mode, a VA (Vertical Alignment) mode, a homogeneous mode, or the like can be used. The display device 20 receives the illumination light emitted from the light source unit 10. The display device 20 transmits the illumination light and performs light modulation. Then, the display device 20 displays a desired image and video on a display surface thereof.

The light control device 30 receives the display light emitted from the display device 20. The light control device 30 transmits the display light such that the light intensity has a peak in an oblique direction having an angle $\theta_2$ with respect to the normal direction. The angle $\theta_2$ is 30 degrees or more and 60 degrees or less, and preferably satisfies "$\theta_1=\theta_2$". In the present embodiment, the angle $\theta_2$ is approximately 45 degrees. By setting the angles to "$\theta_1=\theta_2$", a light amount of the display light, which passes through the display device 20, shielded by the light control device 30 can be reduced. As a result, it is possible to improve utilization efficiency of the illumination light of the light source unit 10. The specific configuration of the light control device 30 will be described later.

The mirror device 40 receives the display light that passes through the light control device 30. By reflecting the display light, the mirror device 40 displays an aerial image 50 in the air. The display light reflected by the mirror device 40 is visually recognized by a viewer 51 who is on the opposite side of the display device 20 with respect to the mirror device 40. The specific configuration of the mirror device 40 will be described later.

[1-1] Configuration of Light Source Unit 10

FIG. 3 is a side view of the light source unit 10. The light source unit 10 is provided with the light-emitting element 11, a light guide plate 12, a reflective sheet 13, and a prism sheet 14.

The light-emitting element 11 emits the illumination light toward a side surface of the light guide plate 12. In FIG. 3, one light-emitting element is indicated by a square, but the light-emitting element 11 is configured with, for example, a plurality of light-emitting elements lined up in the Y-direction.

The light guide plate 12 guides the illumination light from the light-emitting element 11 and emits the illumination light from a top surface thereof. In addition, the light guide plate 12 emits the illumination light in a direction oblique to the Z-direction.

The reflective sheet 13 reflects the illumination light emitted from a bottom surface of the light guide plate 12 toward the light guide plate 12 again.

The prism sheet 14 causes the illumination light from the light guide plate 12 to be refracted. The prism sheet 14 is provided with a configuration in which a plurality of triangular columns are laid and lined up in the X-direction. In other words, seen in the Y-direction, the top surface of the prism sheet 14 has a ripple form (a saw tooth form). The prism sheet 14 includes a plurality of refraction surfaces 14A inclined to the left-hand side with respect to the normal direction.

The light source unit 10 configured in this manner can emit the illumination light with the emission angle $\theta_1$. In addition, by adjusting an inclination angle of the refraction surface 14A of the prism sheet 14 and a light emission angle of the light guide plate 12, the emission angle $\theta_1$ can be optimally set.

[1-2] Configuration of Light Control Device 30

Figure 4:
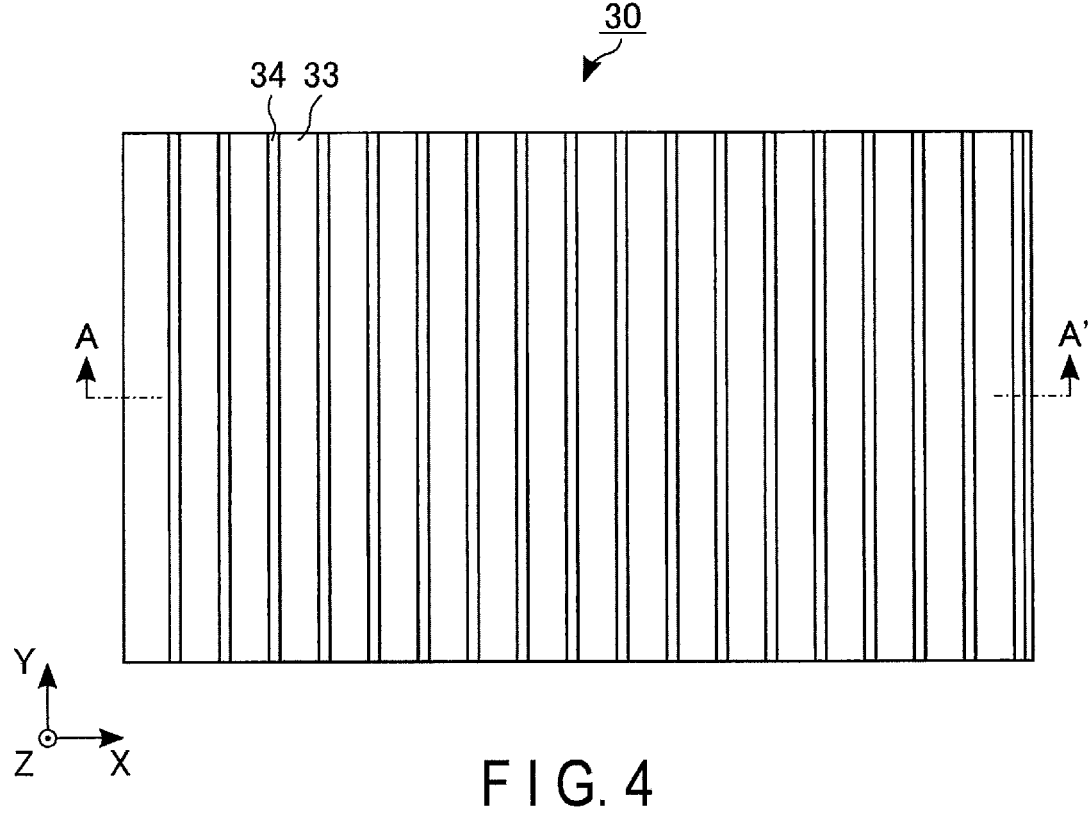
FIG. 4 is a plan view of a light control device shown in FIG. 1.
Figure 5:
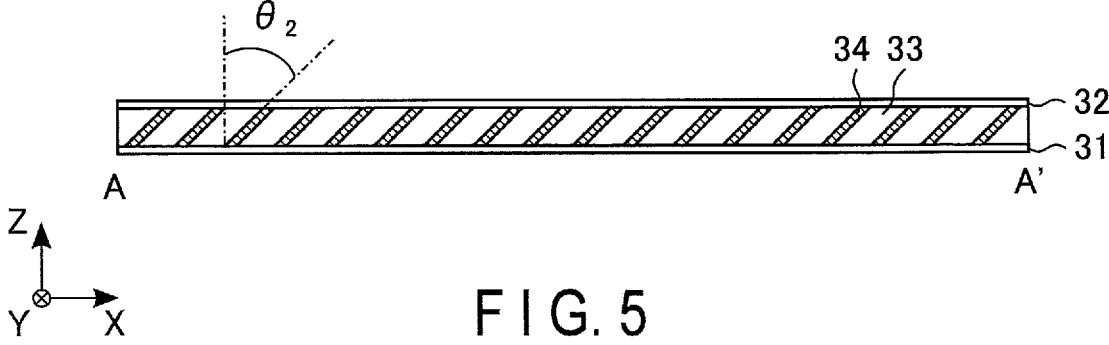
FIG. 5 is a sectional view of the light control device taken along the line A-A' in FIG. 4.

FIG. 4 is a plan view of the light control device 30. FIG. 5 is a sectional view of the light control device 30 taken along the line A-A' in FIG. 4.

On a base member 31, a plurality of transparent members 33 each extending in the Y-direction and lined up in the X-direction are provided. In addition, on the base member 31, a plurality of light shielding members 34 each extending in the Y-direction and lined up in the X-direction are provided. The plurality of transparent members 33 and the plurality of light shielding members 34 are alternately placed such that the adjacent ones are brought into contact with each other.

A cross section of the transparent member 33 is a parallelogram in which a side surface thereof inclines by an inclination angle $\theta_2$. A cross section of the light shielding member 34 is a parallelogram in which a side surface thereof inclines by the inclination angle $\theta_2$. The two adjacent light shielding members 34 are placed such that each other's end portions (specifically, an upper end portion of the one and a lower end portion of the other one) are slightly overwrapped in the Z-direction. The transparent member 33 transmits light. The light shielding member 34 shields light. On the plurality of transparent members 33 and the plurality of light shielding members 34, a base member 32 is provided.

As the base members 31 and 32 and the transparent member 33, a transparent resin is used. An example of the transparent resin to be used is an acryl resin. As the light shielding member 34, a resin into which a black dye is mixed is used, for example.

The light control device 30 configured in this manner can transmit the display light such that the light intensity has a peak in the oblique direction having the angle $\theta_2$ with respect to the normal direction.

[1-3] Configuration of Mirror Device 40

FIG. 6 is a bottom view of the mirror device 40. In other words, FIG. 6 is a diagram in which the mirror device 40 of FIG. 1 is seen from the bottom.

The mirror device 40 is provided with a base member 41, and a plurality of optical elements 42 provided on a bottom surface of the base member 41. The base member 41 is placed parallel to the light source unit 10. The base member 41 and the optical elements 42 are formed of a transparent resin, for example, an acryl resin. The planar shape of the optical element 42 is a quadrangle, and in the present embodiment, it is a square. The optical element 42 includes a reflection surface 42A and a reflection surface 42B.

The optical element 42 is placed such that one side inclines by 45 degrees with respect to the X-direction. The plurality of optical elements 42 are placed in a plurality of rows such that one row is lined up in a direction of 45 degrees with respect to the X-direction.

FIG. 7 shows diagrams describing the optical element 42 of the mirror device 40. In FIG. 7, a view in which the optical element 42 is seen in the X-direction is a front view. FIG. 7(*a*) is a bottom view, FIG. 7(*b*) is the front view, and FIG. 7(*c*) is a right side view.

The optical element 42 has a hexahedron shape and includes a bottom surface 42C, the reflection surface 42A, and the reflection surface 42B. The reflection surfaces 42A and 42B of the optical element 42 correspond to two side surfaces that are on the opposite side of the front surface. The reflection surface 42A and the reflection surface 42B form the so-called dihedral corner reflector.

The reflection surface 42A inclines to the central side of the optical element 42 with respect to the Z-direction by an inclination angle $\theta_3$. The inclination angle $\theta_3$ is larger than zero degrees and 45 degrees or less. In the similar manner, the reflection surface 42B inclines to the central side of the optical element 42 with respect to the Z-direction by the inclination angle of $\theta_3$. Note that the relation of "$\theta_3 < \theta_2$" is satisfied. The angle formed by the reflection surface 42A and the reflection surface 42B is 90 degrees.

In addition, the side to which the reflection surface 42A and the reflection surface 42B inclines is the same as the side to which the emission angle $\theta_2$ of the light control device 30 inclines. Specifically, the reflection surface 42A and the reflection surface 42B incline to the right side with respect to the normal direction and the emission angle $\theta_2$ of the light control device 30 inclines to the right side with respect to the normal direction.

The bottom surface 42C of the optical element 42 is formed obliquely so that the height of the optical element 42 rises toward the X-direction. Each of the angle between the reflection surface 42A and the bottom surface 42C and the angle between the reflection surface 42B and the bottom surface 42C is 90 degrees.

In the mirror device 40 configured in this manner, the display light made incident to the optical element 42 with the angle $\theta_2$ is reflected twice by the reflection surface 42A and the reflection surface 42B, and emitted roughly to the normal direction.

[2] Light Emission Angle of Mirror Device 40

Figure 8:
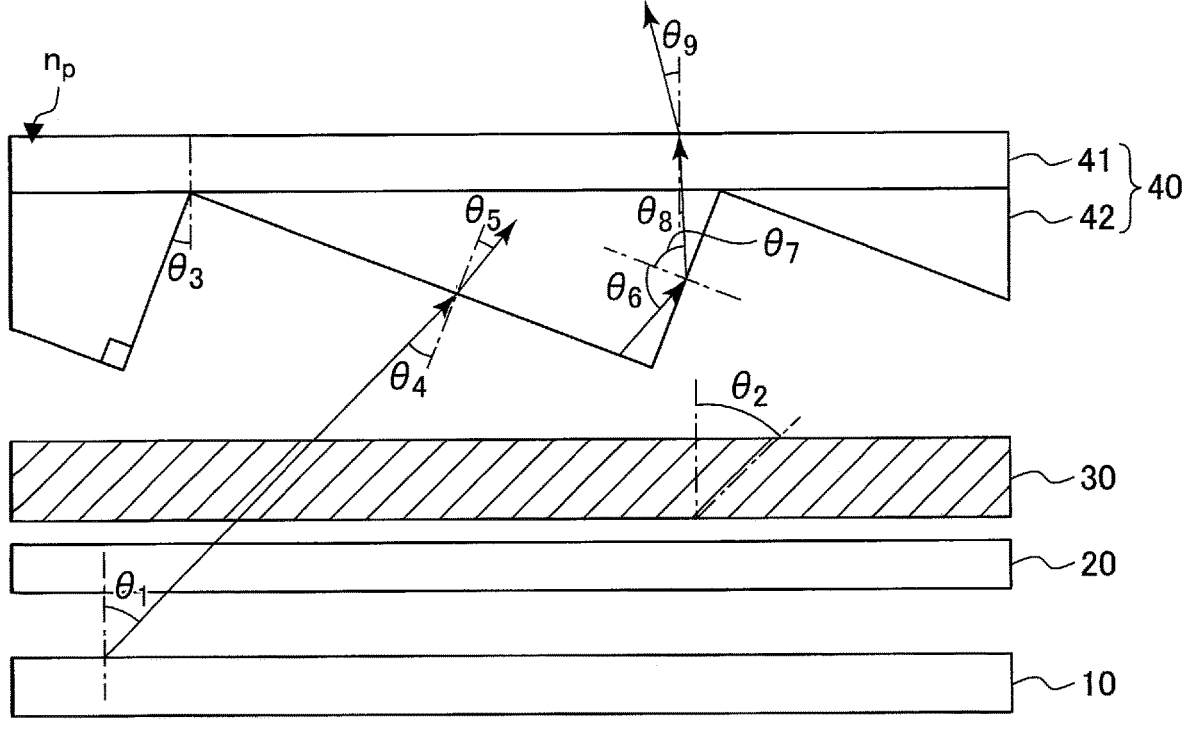
FIG. 8 is a schematic sectional view describing a light emission angle of the mirror device.

FIG. 8 is a schematic sectional view describing a light emission angle of the mirror device 40. $\theta_1$ is the emission angle of the light source unit 10, 02 is the emission angle of the light control device 30, and $\theta_3$ is the inclination angle of the reflection surface 42A and the reflection surface 42B of the optical element 42. The index of refraction of the mirror device 40 is $n_p$, and the index of refraction of air is 1.

The light (the display light) emitted from the light control device 30 is made incident to the optical element with an incidence angle $\theta_4$, and is refracted with a refraction angle $\theta_5$. The light travelling through the optical element 42 is reflected with a reflection angle $\theta_6$ and a reflection angle $\theta_7$ ($=\theta_6$). The light reflected within the optical element 42 is made incident, with an incidence angle $\theta_8$, to an interface with the air, and is refracted with a refraction angle $\theta_9$. In other words, the light that is made incident to the mirror device 40 is emitted from the mirror device 40 with the emission angle $\theta_9$.

The emission angle $\theta_9$ is expressed by the following expressions.

$$\theta_9 = \sin^{-1}(n_p \cdot \sin(\theta_3 - \sin^{-1}(\sin\theta_4/n_p)))$$

$$\text{Critical angle} < \theta_6 (=\theta_7)$$

$$\text{Critical angle} = \sin^{-1}(1/n_p)$$

The emission angle $\theta_9$ is set in the range of ±30 degrees with respect to the normal direction. In the present embodiment, the emission angle $\theta_9$ is set to approximately 0 degrees. Thus, the inclination angle $\theta_3$, the incidence angle $\theta_4$, and the index of refraction $n_p$ are appropriately set such that the emission angle $\theta_9$ is approximately 0 degrees.

[3] Block Configuration of Aerial Display Apparatus 1

FIG. 9 is a block diagram of the aerial display apparatus 1. The aerial display apparatus 1 is provided with the light source unit 10, the display device 20, the light control device 30, the mirror device 40, a display driving unit 60, a voltage generation circuit 61, and a control circuit 62.

The display driving unit 60 drives the display device 20 to cause the display device 20 to display an image and a video. The voltage generation circuit 61 generates a plurality of types of voltages necessary for the light source unit 10 and the display driving unit 60 to operate, and supplies these voltages to the light source unit 10 and the display driving unit 60.

The control circuit 62 controls an operation of the entire aerial display apparatus 1. In other words, the control circuit 62 controls the light source unit 10, the display driving unit 60, and the voltage generation circuit 61. Then, the control circuit 62 causes an aerial image 50 to be displayed at a desired display position.

[4] Operation

An operation of the aerial display apparatus 1 configured as described above will be described.

The light source unit 10 produces the illumination light and emits this illumination light toward the display device 20. In addition, the light source unit 10 emits the illumination light such that the light intensity has a peak in the oblique direction having the angle $\theta_1$ with respect to the normal direction. In the present embodiment, the angle $\theta_1$ is approximately 45 degrees.

FIG. 10 is a chart showing a relation between the intensity and the angle in the illumination light emitted from the light source unit 10. The vertical axis of FIG. 10 indicates a relative value (%) of the intensity of the illumination light emitted from the light source unit 10, and the horizontal axis of FIG. 10 indicates the angle (degree) of the illumination light emitted from the light source unit 10 with respect to the normal direction.

As is understood from FIG. 10, the light intensity of the illumination light emitted from the light source unit 10 has a peak at 45 degrees ($=\theta_1$). In addition, a majority of the light emitted from the light source unit 10 is within the angle range of 30 to 60 degree.

The display device 20 transmits the illumination light from the light source unit 10 and displays an image and a video.

The light control device 30 receives the display light from the display device 20, and transmits the display light such that the light intensity has a peak in the oblique direction having the angle $\theta_2$ with respect to the normal direction. In the present embodiment, the angle $\theta_2$ is approximately 45 degrees.

FIG. 11 is a chart showing a relation between the intensity and the angle in the display light emitted from the light control device 30. The vertical axis of FIG. 11 indicates a relative value (%) of the intensity of the display light emitted from the light control device 30, and the horizontal axis of FIG. 11 indicates the angle (degree) of the display light emitted from the light control device 30 with respect to the normal direction.

As is understood from FIG. 11, the light intensity of the display light emitted from the light control device 30 has a peak at 45 degrees (=$\theta_2$). In addition, a majority of the light emitted from the light control device 30 is within the angle range of 30 to 60 degrees. Furthermore, of the display light emitted from the display device 20, unnecessary light is shielded by the light control device 30.

The display light emitted from the light control device 30 is made incident obliquely to the mirror device 40, in other words, at approximately 45 degrees with respect to the normal direction. The mirror device 40 reflects the display light, and emits the display light with the emission angle $\theta_9$ of approximately 0 degrees.

Thereby, the aerial image 50 can be displayed at the desired display position. The aerial image 50 is visually recognized by the viewer.

In the prior art, each mirror surface of the dihedral corner reflector array is placed upright and approximately vertically to an element surface. On the other hand, in the present embodiment, the dihedral corner reflector array is placed at an arbitrary angle with respect to the element surface. In addition, the present embodiment has a characteristic that light of a particular incidence angle emitted from the display device is reflected to an arbitrary direction by the placement of the mirror surfaces of the dihedral corner reflector, thereby generating the aerial image at an arbitrary position that is not a plane-symmetric position. Furthermore, in terms of production, the present embodiment has a characteristic that the accuracy of the mirror surface of the reflection surface can be secured (mold releasability is facilitated) because each mirror surface of the dihedral corner reflectors is not placed vertically with respect to a pulling direction of the mold.

[5] Advantageous Effects of Embodiment

In the present embodiment, the light source unit 10, the display device 20, the light control device 30, and the mirror device 40 are placed in this order along the normal direction and are also placed such that the respective principal planes are parallel to each other. In addition, the light source unit 10, the display device 20, and the light control device 30 cause the display light to be made incident to the mirror device 40 in the direction oblique to the normal direction. The mirror device 40 reflects the display light from the light control device 30, and causes an image to be displayed in the air on the opposite side of the light control device 30.

Therefore, according to the present embodiment, it is not necessary to place the light source unit 10 and the display device 20 obliquely to the mirror device 40. This makes it possible to realize the aerial display apparatus 1 that can be made smaller in the normal direction, while maintaining a display quality of the aerial image.

In addition, the light that is not required for display is substantially shielded by the light control device 30. This makes it possible to improve the contrast of the aerial image. As a result, the display quality of the aerial display apparatus 1 can be improved.

In addition, the emission angle $\theta_1$ of the light source unit 10 is the same as the inclination angle $\theta_2$ of the light shielding member 34 of the light control device 30. This makes it possible to improve the light utilization efficiency of the illumination light emitted from the light source unit 10.

[6] Modification

In the present embodiment described above, the mirror device 40 is configured to be provided with the plurality of optical elements 42 each having a hexahedron shape. However, the configuration of the mirror device 40 is not limited to this. For example, the mirror device 40 may be configured to include a plurality of holes on a transparent base member, each of the plurality of holes including the two reflection surfaces 42A and 42B that are placed at a right angle. In other words, the optical element that reflects the light twice may be a convex type, or may be a concave type.

The present invention is not limited to the foregoing embodiments. When the invention is reduced to practice, a variety of modifications can be made without departing from the spirit of the invention. The embodiments can be combined as appropriate, and advantageous effects can be obtained from the combination. Furthermore, the foregoing embodiments include a variety of inventions, and a variety of inventions can be extracted by selecting and combining a plurality of structural elements. For example, even though some of the structural elements are deleted from the embodiments, a configuration from which the structural elements are deleted can be extracted as an invention if the problem can be solved and an advantageous effect can be obtained.

The invention claimed is:

1. An aerial display apparatus comprising:
a light source unit that emits light;
a display device that transmits the light from the light source unit to display an image;
a light control device that transmits the light from the display device to emit the light such that light intensity of the light has a peak in a direction oblique to a normal direction that is perpendicular to a first direction within a principal plane of the display device; and
a mirror device that reflects the light from the light control device to display an aerial image in air on a side opposite to the light control device,
wherein the display device, the light control device, and the mirror device are parallel to each other,
the mirror device includes a planar base member and a plurality of optical elements each having a hexahedron shape and provided on the base member on a side of the light control device,
each of the plurality of optical elements includes first and second reflection surfaces that reflect light, and
each of the first and second reflection surfaces is placed obliquely to the normal direction.

2. The aerial display apparatus according to claim 1, wherein each of the first and second reflection surfaces is placed obliquely to the first direction in a plane view.

3. The aerial display apparatus according to claim 1, wherein the mirror device is configured to image the aerial image in the normal direction.

4. The aerial display apparatus according to claim 1, wherein a bottom surface of the optical element on a side of the light control device is placed obliquely to the first direction.

5. The aerial display apparatus according to claim 1, wherein the first reflection surface and the second reflection surface form an angle of 90 degrees.

6. The aerial display apparatus according to claim 1, wherein
the light control device includes a plurality of transparent members and a plurality of light shielding members,
the plurality of transparent members and the plurality of light shielding members are alternately placed, and
the light shielding members are placed obliquely to the normal direction.

7. The aerial display apparatus according to claim 1, wherein the light source unit emits the light such that light intensity of the light has a peak in a direction oblique to the normal direction.

8. The aerial display apparatus according to claim 1, wherein the display device is a liquid crystal display device.

9. The aerial display apparatus according to claim 1, wherein the optical element includes two triangular side surfaces.

\* \* \* \* \*